United States Patent
Rea et al.

(10) Patent No.: US 9,646,276 B2
(45) Date of Patent: May 9, 2017

(54) DASHBOARD FOR DYNAMIC DISPLAY OF DISTRIBUTED TRANSACTION DATA

(71) Applicant: AppDynamics, Inc., San Francisco, CA (US)

(72) Inventors: Sean Rea, San Francisco, CA (US); Joseph Angeles, San Francisco, CA (US); Thomas Keeney, San Francisco, CA (US)

(73) Assignee: AppDynamics, Inc., San Francisco, CA (US)

( * ) Notice: Subject to any disclaimer, the term of this patent is extended or adjusted under 35 U.S.C. 154(b) by 382 days.

(21) Appl. No.: 13/975,225

(22) Filed: Aug. 23, 2013

(65) Prior Publication Data

US 2015/0058092 A1 Feb. 26, 2015

(51) Int. Cl.
*G06Q 10/00* (2012.01)
*G06Q 10/06* (2012.01)

(52) U.S. Cl.
CPC ................ *G06Q 10/0639* (2013.01)

(58) Field of Classification Search
CPC ......... G06Q 10/00; G06Q 40/00; G06F 17/60
USPC ........................................................ 705/7.11
See application file for complete search history.

(56) References Cited

U.S. PATENT DOCUMENTS

| | | | | |
|---|---|---|---|---|
| 5,926,806 A * | 7/1999 | Marshall | ........... | G06F 17/30572 707/752 |
| 6,359,976 B1 * | 3/2002 | Kalyanpur | ............ | H04M 15/00 379/111 |
| 6,996,569 B1 * | 2/2006 | Bedell | ............... | G06F 17/30412 707/737 |
| 7,133,805 B1 * | 11/2006 | Dankenbring | ...... | G06F 11/3414 702/182 |
| 8,140,383 B2 * | 3/2012 | Busch | ............... | G06F 17/30398 705/7.38 |
| 8,341,259 B2 * | 12/2012 | Error | ...................... | G06Q 30/02 709/224 |
| 8,874,642 B2 * | 10/2014 | Bhagat | .................. | G06F 9/5083 709/203 |
| 8,954,871 B2 * | 2/2015 | Louch | ........................... | 715/764 |
| 9,130,860 B1 * | 9/2015 | Boe | .................... | G06F 17/30424 |
| 9,246,773 B2 * | 1/2016 | Degioanni | .......... | G06F 11/3495 |

(Continued)

FOREIGN PATENT DOCUMENTS

| | | | | |
|---|---|---|---|---|
| GB | 2 517 538 | 2/2015 | | |
| WO | WO 02/102097 A1 * | 12/2002 | ............... | H04Q 7/20 |
| WO | WO 2007/072501 A2 * | 6/2007 | | |

OTHER PUBLICATIONS

AppDynamics End User Experience—AppDynamics Pro Documentation—Version 3.8.x AppDynamics, 2012-2014.*

(Continued)

*Primary Examiner* — Romain Jeanty
(74) *Attorney, Agent, or Firm* — Bachmann Law Group

(57) ABSTRACT

An interface is provided for a user to create a custom dashboard for providing application performance data. The dashboard may be created from one or more widgets, such as graphs, charts, and other display components, and each widget may be individually configured with parameters. The dashboard may be configured to display data for one or more particular transactions, transaction types, or transactions that meet specified criteria. Once created, the dashboard may be shared through a website URL, e-mail, or other method.

36 Claims, 11 Drawing Sheets

(56) References Cited

U.S. PATENT DOCUMENTS

| | | | | |
|---|---|---|---|---|
| 2008/0162209 | A1* | 7/2008 | Gu | G06Q 10/0637 |
| 2008/0168044 | A1* | 7/2008 | Barron | G06F 11/3419 |
| 2008/0235075 | A1* | 9/2008 | Couture | G06F 11/3495 709/224 |
| 2010/0228752 | A1* | 9/2010 | Folting | G06F 17/246 707/758 |
| 2010/0274596 | A1* | 10/2010 | Grace | G06Q 10/063114 705/7.15 |
| 2011/0016207 | A1* | 1/2011 | Goulet | G06Q 10/06 709/224 |
| 2012/0266026 | A1* | 10/2012 | Chikkalingaiah | G06F 11/0751 714/38.1 |
| 2013/0246130 | A1* | 9/2013 | Michel | G06Q 10/067 705/7.36 |
| 2013/0332241 | A1* | 12/2013 | Taylor | G06Q 10/0637 705/7.36 |
| 2014/0208215 | A1* | 7/2014 | Deshpande | G06Q 10/00 715/736 |
| 2014/0316845 | A1* | 10/2014 | Nayak | G06Q 10/10 705/7.28 |
| 2015/0019537 | A1* | 1/2015 | Neels | G06F 17/30551 707/722 |

OTHER PUBLICATIONS

AppDynamics Datasheet—The Next Generation of Application Performance Management AppDynamics, Apr. 12, 2012.*

5 Cricital Strategies for Application Performance Management Business White Paper, AppDynamics, Oct. 2010.*

AppDynamics: The Next Generation of Application Performance Management—Datasheet AppDynamics, May 2010.*

Lange, Fabian, Monitorying Application Perforamance with AppDynamics Codecentric, Slideshare,net, Oct. 25, 2010.*

Garbani, Jean-Pierre, Competitive Analysis: Application Performance Management and Business Transaction Monitoring Forrester, Sep. 22, 2010.*

Using Business Activity Monitoring ES Dashboard Adobe Lifecycle ES, Version 8.0, Adobe, Jul. 2007.*

Best Practices for Using Websphere Busieness Modeler and Monitor IBM, Redbooks, 2006.*

IBM Cognos Real-time Monitoring Dashboard Version 10.1.0— User Guide IBM, 2010.*

SAP Solution Manager: Solution Monitoring SAP, 2005.*

Performance Dashboards: Measuring, Monitoring and Managing Your Business The Data Warehouse Institute, 2006.*

AppDynamics.com Web Pages AppDynamics, Nov. 2010, Retrieved from Archive.org Jun. 13, 2016.*

App Dynamics Inc., Product Release 3.3.4 Documentation, 2011.
App Dynamics Inc., Product Release 3.6.6 Documentation, 2012.
App Dynamics Inc., Product Release 3.7 Documentation, 2013.

* cited by examiner

500

DASHBOARD FOR DYNAMIC DISPLAY OF DISTRIBUTED TRANSACTION DATA

BACKGROUND

The World Wide Web has expanded to provide web services faster to consumers. Web services may be provided by a web application which uses one or more services to handle a transaction. The applications may be distributed over several machines, making the topology of the machines that provides the service more difficult to track and monitor.

Monitoring a web application helps to provide insight regarding bottle necks in communication, communication failures and other information regarding performance of the services that provide the web application. Most application monitoring tools provide a standard report regarding application performance. Though the typical report may be helpful for most users, it may not provide the particular information that an administrator wants to know.

There is a need in the art for improved application performance reporting.

SUMMARY

An interface is provided for a user to create a custom dashboard for providing data retrieved from, generated from, or associated with one or more monitored business transactions and/or nodes which perform one or more transactions. The data may include application performance data, node hardware metrics, node JMX metrics, error rates, and other metrics and/or data. The dashboard may be created from one or more widgets, such as graphs, charts, and other display components, and each widget may be individually configured with parameters. The dashboard generated from the interface may be configured to display data for one or more particular transactions, transaction types, or transactions that meet specified criteria. Once created, the dashboard may be shared through a website URL, e-mail, or other method.

In an embodiment, a method for reporting data may provide an interface by a server to a remote device. The interface may be used to configure a report for transaction performance data. Input may be received which specifies a category of transactions. Performance data may be reported for one of more transactions that are within the specified category.

In an embodiment, a method for reporting data may provide an interface by a server to a remote device for configuring a report for transaction performance data. An input may be received which specifies a filter for displaying a category of entities. Performance data may be reported for one or more entities that satisfy the filter, wherein the performance data may be selected dynamically at the time the performance data is reported.

A system for processing a reporting data may include a server having a memory and a processor. One or more modules may be stored in the memory and executable by the processor to provide an interface for configuring a report for transaction performance data. The one or more modules may also be executable to receive an input which specifies a category of transactions, and report performance data for one of more transactions that are within the specified category. In embodiments, the modules may be executable to provide an interface for configuring a report for transaction performance data, receive input which specifies a filter for displaying a category of entities, and report performance data may be reported for one or more entities that satisfy the filter, wherein the performance data may be selected dynamically at the time the performance data is reported.

DETAILED DESCRIPTION

Figure 1:
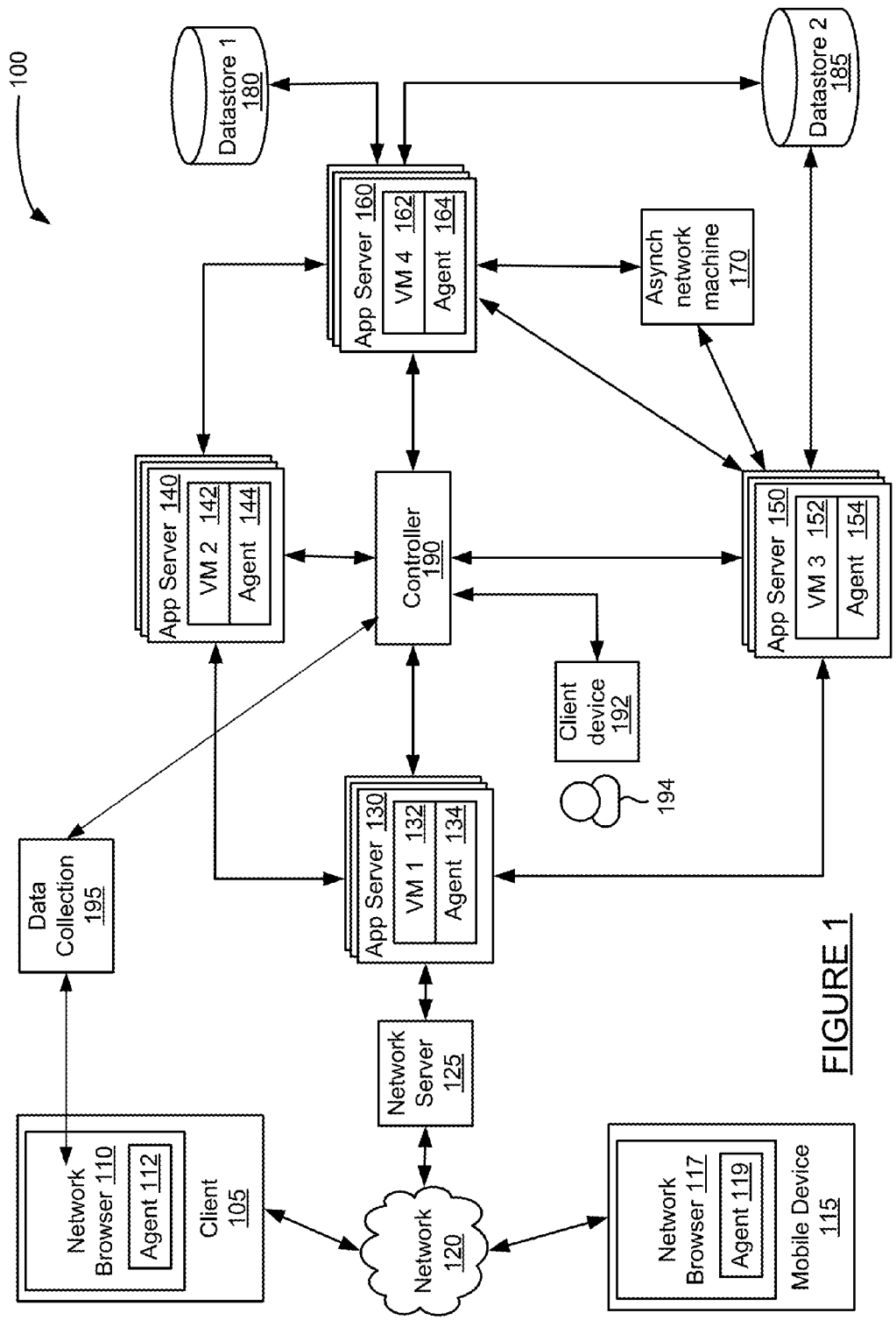
FIG. 1 is a block diagram of a system for providing a custom dashboard.

The present technology provides an interface from one or more servers to one or more remote devices. The interface may be used to create a custom dashboard for reporting data retrieved from, generated from, or associated with one or more monitored business transactions and/or nodes which perform one or more transactions. The data may include application performance data, node hardware metrics, node JMX metrics, error rates, and/or other metrics and/or data. The dashboard may be created from one or more widgets, such as graphs, charts, and other display components. Widgets may be configured individually or as a group of one or more widgets with parameters. The dashboard may be configured to display data for one or more particular transactions, transaction types, transactions that meet specified criteria, metrics for machines such as virtual machines, or other data. Once created, the dashboard may be shared through a website URL, e-mail, or other method.

Though embodiments of dashboards are discussed herein which provide application performance data, it is intended that a dashboard may be created with any type of data associated with one or metrics.

The interface provided by the present system to generate the dashboard may allow a user to select a number of widget and configure each widget. In embodiments, the interface allows a user to configure any of a number of properties for each widget. The properties may be configured through drop down menus, boxes, and other interface mechanisms. Once created, the dashboard can be saved, shared and edited by the user or others.

The dashboard may display data for a plurality of transactions. The plurality of transactions may be identified by parameters such as business transaction type, specified criteria, and other parameters. Once the parameters are specified, the dashboard may dynamically update to provide data for transactions that are generated in the future which meet the criteria. The dashboard may also update dynamically to not display data from transactions that are subsequently deleted or otherwise don't meet the criteria. As such, the dashboard provides an up-to-date, dynamic representation of the most current data specifically requested by the user.

Instances of the present invention may provide for a dashboard to dynamically provide up to date information regarding a system being monitored. A user may create a dashboard through an interface, at least in part by creating filters that select entities such as for example business transactions, tiers of machines or nodes, nodes consisting of a software program and/or hardware component (memory, processor, and so forth), and plot metrics for the entities. A user may configure the dashboard to provide data based on a filter, such as for example to display data for the top of bottom N entities. The filter will be applied to data dynamically when the dashboard is viewed, such that the filter may return different entities at different times dependent on what entities satisfy or don't satisfy the filter. Put another way, a first set of entities that satisfy the filter at a first time (for example at the time of receiving input specifying the filter) may differ from a second set of entities that satisfy the filter at the time the performance data is reported.

FIG. 1 is block diagram of a system for creating a custom dashboard. The custom dashboard of the present technology may report data, such as for example performance data, generated from, retrieved from, or associated with monitoring a distributed application system, an example of which is shown in FIG. 1. System 100 of FIG. 1 includes client device 105 and 192, mobile device 115, network 120, network server 125, application servers 130, 140, 150 and 160, asynchronous network machine 170, data stores 180 and 185, controller 190, and data collection server 195.

Client device 105 may include network browser 110 and be implemented as a computing device, such as for example a laptop, desktop, workstation, or some other computing device. Network browser 110 may be a client application for viewing content provided by an application server, such as application server 130 via network server 125 over network 120.

Network browser 110 may include agent 112. Agent 112 may be installed on network browser 110 and/or client 105 as a network browser add-on, downloading the application to the server, or in some other manner. Agent 112 may be executed to monitor network browser 110, the operation system of client 105, and any other application, API, or other component of client 105. Agent 112 may determine network browser navigation timing metrics, access browser cookies, and transmit data to data collection 160, controller 190, or another device. Agent 112 may perform other operations related to monitoring a request at client 105 as discussed herein.

Mobile device 115 is connected to network 120 and may be implemented as a portable device suitable for sending and receiving content over a network, such as for example a mobile phone, smart phone, tablet computer, or other portable device. Both client device 105 and mobile device 115 may include hardware and/or software configured to access a web service provided by network server 125.

Mobile device 115 may include network browser 117 and an agent 119. Agent 119 may reside in and/or communicate with network browser 117, as well as communicate with other applications, an operating system, APIs and other hardware and software on mobile device 115. Agent 119 may have similar functionality as that described herein for agent 112 on client 105, and may repot data to data collection server 160 and/or controller 190.

Network 120 may facilitate communication of data between different servers, devices and machines of system 100 (some connections shown with lines to network 120, some not shown). The network may be implemented as a private network, public network, intranet, the Internet, a cellular network, Wi-Fi network, VoIP network, or a combination of one or more of these networks.

Network server 125 is connected to network 120 and may receive and process requests received over network 120. Network server 125 may be implemented as one or more servers implementing a network service, and may be implemented on the same machine as application server 130. When network 120 is the Internet, network server 125 may be implemented as a web server. Network server 125 and application server 130 may be implemented on separate or the same server or machine Application server 130 communicates with network server 125, application servers 140 and 150, controller 190. Application server 130 may also communicate with other machines and devices (not illustrated in FIG. 1). Application server 130 may host an application or portions of a distributed application and include a virtual machine 132, agent 134, and other software modules. Application server 130 may be implemented as one server or multiple servers as illustrated in FIG. 1.

Virtual machine 132 may be implemented by code running on one or more application servers. The code may implement computer programs, modules and data structures to implement a virtual machine mode for executing programs and applications. In some embodiments, more than one virtual machine 132 may execute on an application server 130. A virtual machine may be implemented as a Java Virtual Machine (JVM). Virtual machine 132 may perform all or a portion of a business transaction performed by application servers comprising system 100. A virtual machine may be considered one of several services that implement a web service.

Virtual machine 132 may be instrumented using byte code insertion, or byte code instrumentation, to modify the object code of the virtual machine. The instrumented object code may include code used to detect calls received by virtual machine 132, calls sent by virtual machine 132, and communicate with agent 134 during execution of an application on virtual machine 132.

In some embodiments, server 130 may include other applications and/or code than a virtual machine. For example, server 130 may include PHP code, Ruby code, or other code to implement applications and process requests received from a remote source. When a serer includes a PHP module, for example, the PHP may have entry points and exit points that are modified with "hooks" which inform an agent when the PHP module is called or makes a call to another node. Though examples discussed herein may refer to a virtual machine, it is intended that the functions discussed with respect to a virtual machine may be performed by PHP applications or other code.

Agent 134 on application server 130 may be installed, embedded, or otherwise provided on application server 130. For example, agent 134 may be provided in server 130 by instrumentation of object code, downloading the application to the server, or in some other manner. Agent 134 may be executed to monitor application server 130, monitor code running in a or a virtual machine 132 (or other program, such as a PHP program), and communicate with byte instrumented code on application server 130, virtual machine 132 or another application on application server 130. Agent 134 may detect operations such as receiving calls and sending requests by application server 130 and virtual machine 132. Agent 134 may receive data, for example from instrumented code of the virtual machine 132, and process the data and transmit the data to controller 190. Agent 134 may perform other operations related to monitoring virtual machine 132 and application server 130 as discussed herein. For example, agent 134 may identify other applications, share business transaction data, aggregate detected runtime data, and other operations.

An agent may operate to monitor a node, tier or nodes or other entity. A node may be a software program or a hardware component (memory, processor, and so on). A tier of nodes may include a plurality of nodes which may process a similar business transaction, may be located on the same server, may be associated with each other in some other way, or may not be associated with each other.

Agent 134 may create a request identifier for a request received by server 130 (for example, a request received by a client 105 or 115 associated with a user or another source). The request identifier may be sent to client 105 or mobile device 115, whichever device sent the request. In embodiments, the request identifier may be created when a data is collected and analyzed for a particular business transaction. Additional information regarding collecting data for analysis is discussed in U.S. patent application Ser. No. 12/878,919, titled "Monitoring Distributed Web Application Transactions," filed on Sep. 9, 2010, U.S. patent application Ser. No. 13/189,360, titled "Automatic Capture of Diagnostic Data Based on Transaction Behavior Learning," filed on Jul. 22, 2011, and U.S. patent application Ser. No. 13/365,171, titled "Automatic Capture of Detailed Analysis Information for Web Application Outliers with Very Low Overhead," filed on Feb. 2, 2012, the disclosures of which are incorporated herein by reference.

Each of application servers 140, 150 and 160 may include an application and an agent. Each application may run on the corresponding application server or a virtual machine. Each of virtual machines 142, 152 and 162 on application servers 140-160 may operate similarly to virtual machine 132 and host one or more applications which perform at least a portion of a distributed business transaction. Agents 144, 154 and 164 may monitor the virtual machines 142-162, collect and process data at runtime of the virtual machines, and communicate with controller 190. The virtual machines 132, 142, 152 and 162 may communicate with each other as part of performing a distributed transaction. In particular each virtual machine may call any application or method of another virtual machine.

Asynchronous network machine 170 may engage in asynchronous communications with one or more application servers, such as application server 150 and 160. For example, application server 150 may transmit several calls or messages to an asynchronous network machine. Rather than communicate back to application server 150, the asynchronous network machine may process the messages and eventually provide a response, such as a processed message, to application server 160. Because there is no return message from the asynchronous network machine to application server 150, the communications between them are asynchronous.

Data stores 180 and 185 may each be accessed by application servers such as application server 150. Data store 185 may also be accessed by application server 150. Each of data stores 180 and 185 may store data, process data, and return queries received from an application server. Each of data stores 180 and 185 may or may not include an agent.

Controller 190 may control and manage monitoring of business transactions distributed over application servers 130-160. In some embodiments, controller 190 may receive runtime data, including data associated with monitoring client requests at client 105 and mobile device 115, from data collection server 160. In some embodiments, controller 190 may receive runtime data from each of agents 112, 119, 134, 144 and 154. Controller 190 may associate portions of business transaction data, communicate with agents to configure collection of runtime data, and provide performance data and reporting through an interface. The interface may be viewed as a web-based interface viewable by client device 192, which may be a mobile device, client device, or any other platform for viewing an interface provided by controller 190. In some embodiments, a client device 192 may directly communicate with controller 190 to view an interface for monitoring data.

Client device 192 may include any computing device, including a mobile device or a client computer such as a desktop, work station or other computing device. Client computer 192 may communicate with controller 190 to create and view a custom interface. In some embodiments, controller 190 provides an interface for creating and viewing the custom interface as content page, e.g. a web page, which may be provided to and rendered through a network browser application on client device 192.

Figure 2:
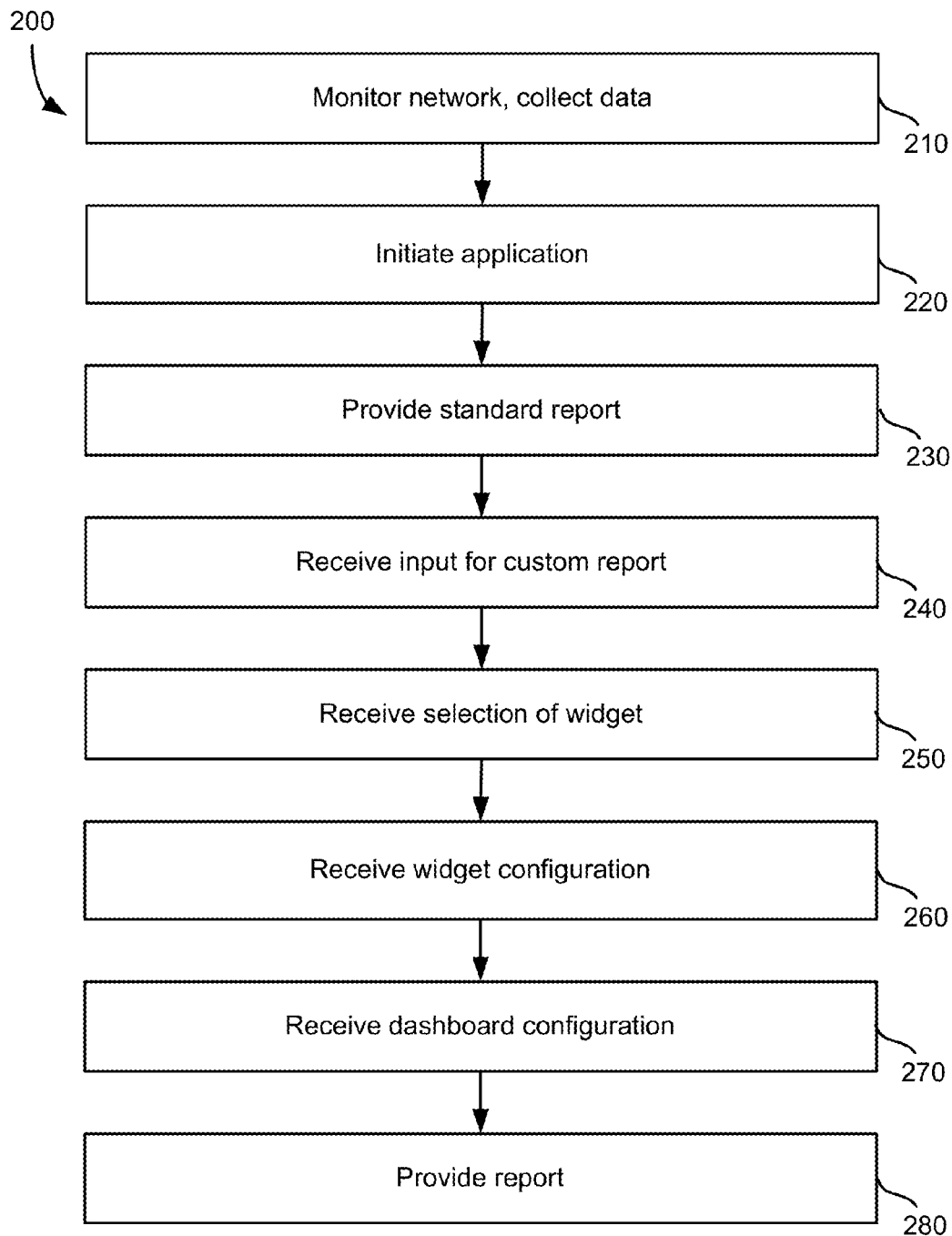
FIG. 2 is a method for generating a custom dashboard.

FIG. 2 is a method for generating a custom dashboard. First, one or more distributed applications may be monitored and data may be collected at step 210. The data may be monitored and collected at least initially by agents 112, 119, and 134-154 for the one or more distributed applications. The distributed applications may occur over one more servers being monitored, such as for example the servers in the system of FIG. 1. Each agent may collect and aggregate data, and then send the data ultimately to controller 190. In some embodiments, data may be sent to controller 190 through an intervening machine. For example, agent 112 collecting monitoring data at client 105 may send data to a machine which aggregates the data and transmits the aggregated monitoring data collected at client 105 to controller 190.

An application is initiated for generating a custom dashboard at step 220. The application may be provided by controller 190 or some other application having access to aggregated data and other monitoring data. The application may provide a custom interface and may be a network application provided over a network by controller 190, a client application, a web page, or some other application.

A standard report may be provided based on the collected data at step 230. The standard report may include one or more metrics which are automatically provided based on the monitoring at step 230.

Input may be received to generate a custom report at step 240. The input may be received through an interface provided through a web page or other interface. The input may result in the present system providing an interface from which a custom interface or dashboard may be generated.

Figure 4:
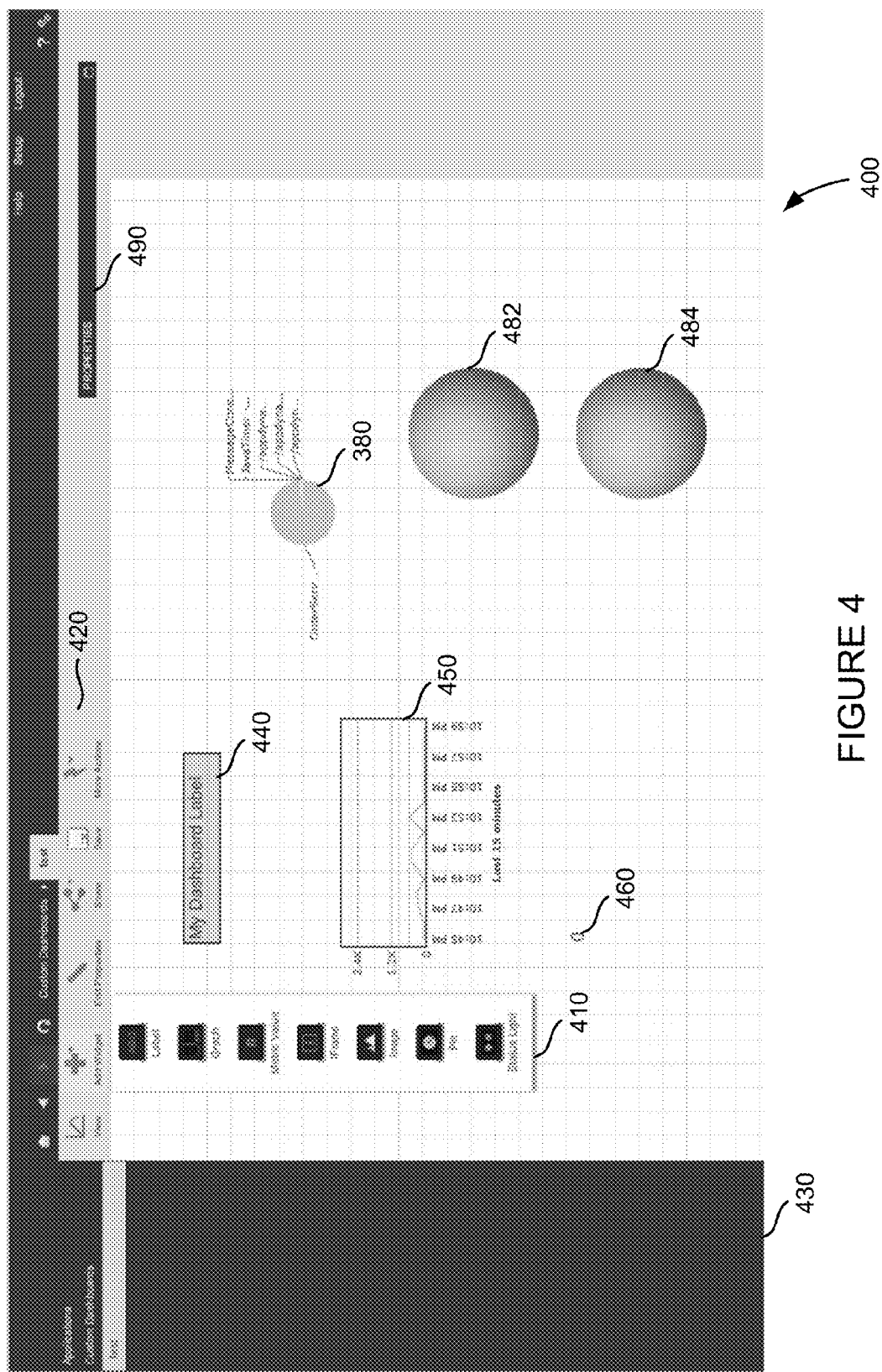
FIG. 4 is an exemplary interface for creating a custom dashboard.

Once an interface for constructing a custom dashboard is provided, the custom dashboard may be generated, for example by selecting from one or more widgets to add to the dashboard. A selection is received for a widget at step 250. A widget may include a virtual object, icon, or other component that may be placed within a custom interface. A widget may be selected from a drop down menu within an interface for creating a dashboard and may be configured by a user creating the dashboard. An example of several widgets selectable from a drop down menu is shown in the exemplary interface of FIG. 4. As shown in FIG. 4, a user may select a widget to add to a custom dashboard through a toolbar provided within the interface. Examples of possible widgets that may be added include a label, graph, metric value, IFrame, image, pie chart and status light. When selected, the widget may appear on the interface. A user may then provide input to position the widget anywhere within the interface, as well as adjust the size of the widget.

Widget configuration may be received at step 260. Configuring a widget may provide details that specify how the widget should be displayed, what data it will display, how it will function, and other configurations.

Figure 5:
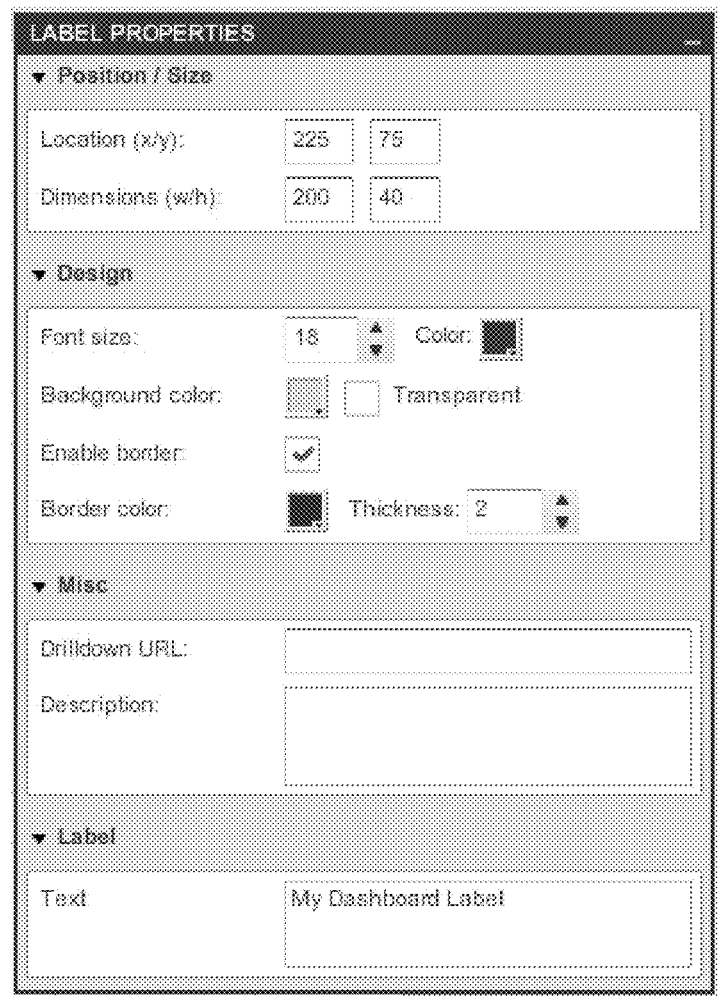
FIG. 5 is an interface for configuring properties for a dashboard label.

When a widget is selected to be configured, a menu for configuring the widget properties may be provided through the interface creation tool. A user may then enter one or more properties to configure the widget. FIG. 5 is an interface for configuring properties for a dashboard label. The interface of FIG. 5 allows a user to configure label properties such as position and size, design, label, and other data. The location data may be specified as an x-y coordinate and the dimensions may be specified as a width and height measurement. The design configurations may include specifying a font size for the label, a color, background color, whether to include a border or not, and the thickness and color of the border. The label may be configured with a text, such as "my dashboard label." Other label properties may include a URL to render when the label is clicked within the dashboard and a description to provide if the label is selected.

Configuration of a metric value widget may be similar to that for a label. Configurable properties for a metric value to display within a dashboard may include a position and size, the metric value design, a drilldown URL, the metric to display and a time range. The position size configuration may be similar to that of a dashboard label. The design of the metric value may include specifying the font size, background color, font color, and border data. Metrics to display may include specific identification of the metric, which may include showing the value of the metric, the maximum value, the minimum value of the selected metric or other information about the metric and a format string which specifies a format which contains how to display the metric, such as the value of the metric, a selected time range, a name of the metric and so forth. The time range associated with metric may also be selected and may include a number of minutes, hours, days, weeks, months or other information for which the metric should be displayed.

Figure 6:
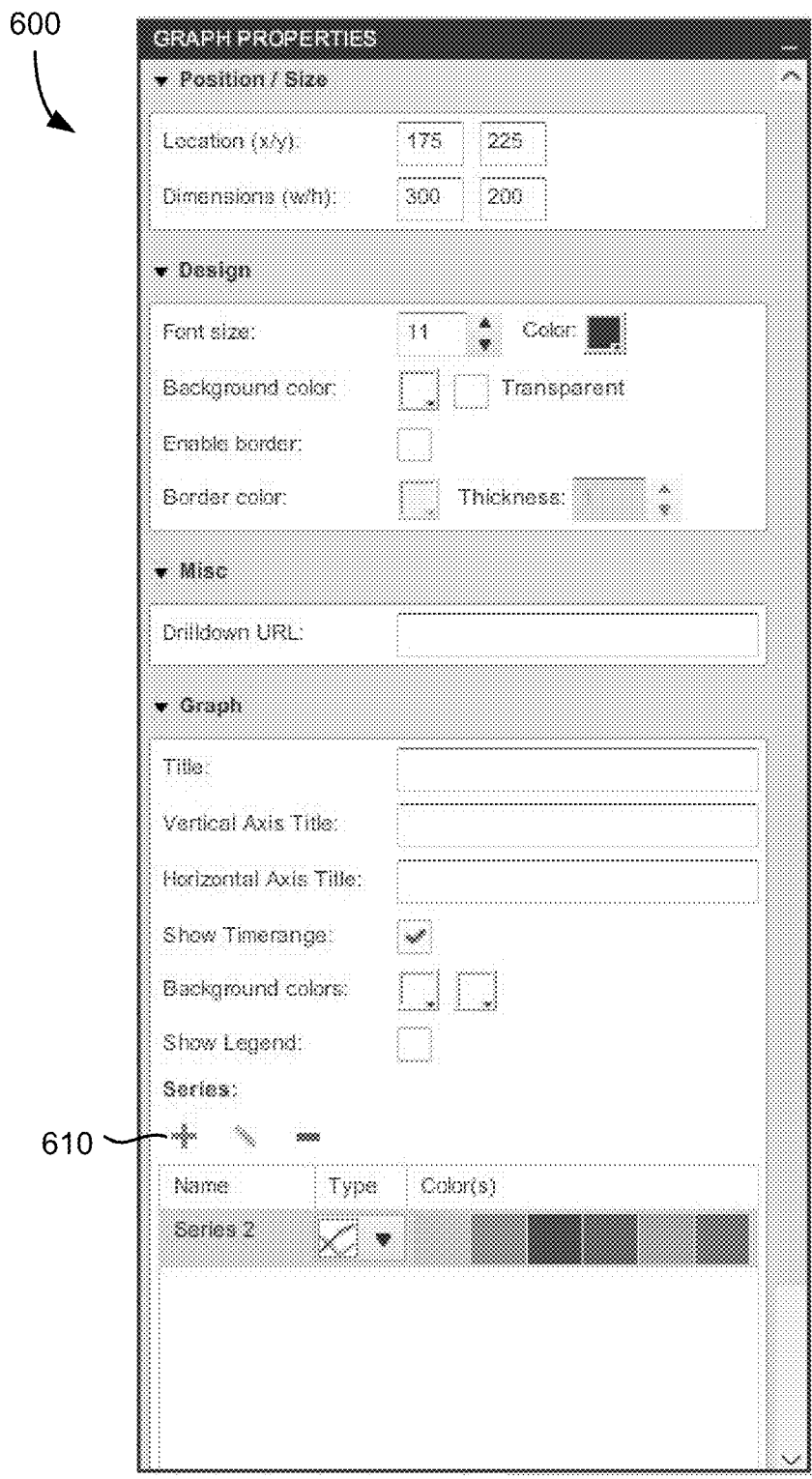
FIG. 6 is an interface for configuring properties for a dashboard graph.

FIG. 6 illustrates an interface for configuring properties of a graph widget. A graph widget may be configured with position and size information, design information, a drilldown URL and other data, as well as configurations for the particular graph. The graph configurations may include a graph title, vertical axis title and horizontal axis title, a time range or window, background colors, and a graph legend. Icons 610 may be selected for adding, removing or editing a series of data to be shown within the graph. For example, an icon shaped like an addition symbol "+" may be used to add a series. Information for configuring a series of data to be shown in a graph is discussed with respect to the method of FIG. 3 and the interfaces of FIGS. 7 and 8.

A pie chart may include properties similar to that of a graph, such as for example position and size, design, graph, and time range. The position and size data for a graph may include a location and dimensions. The design data may include a font size and color, background color, whether to include a border and the color and thickness of the border. A drilldown URL may be associated with a particular pie chart. The graph data that may be specified include a title, whether to show a legend, labels, values, or the values as a percentage. The graph data may also be configured with a particular series, which may be added, edited or removed, as well as color data to associate with a particular series. A time range may also be associated with each pie chart, and may be specified as any number of minutes, hours, days, weeks, months or other time period.

A status light widget may indicate a status of a particular metric or rule. The properties for a status light or "health rule status" may include position and size, design, drilldown URL, a health rule and time range. The position and size may include the location and dimension of the particular status light. The design data may include font size and color, a background color, and whether to include a border, the color of the border and the thickness of the border. A drilldown URL may be associated with a particular status light. A health rule may be specified for a particular application and a particular rule. Selecting the health rule may involve selecting an application from a dropdown menu or other mechanism and selecting a name for the rule. Exemplary names for the rule include business transaction response time is much higher than normal, business transaction error rate is much higher than normal, CPU utilization is too high, memory utilization is too high, JVM heap utilization is too high, JVM garbage collection time is too high, and CLR garbage collection time is too high. A time range may be associated with the status light as any number of minutes, hours, days, weeks or months.

Returning to the method of FIG. 2, a dashboard configuration may be received at step 270. The dashboard configuration may be received through the dashboard creation interface, such as for example through toolbar 420 of the interface of FIG. 4. Dashboard properties may include the dashboard name, an auto refresh interval, the width and height of the dashboard, and a background color of the dashboard.

A report may be provided which may include the custom dashboard at step 280. The custom dashboard may be reported by sharing the custom dashboard, copying the dashboard to a new window, or e-mailing the dashboard.

Figure 3:
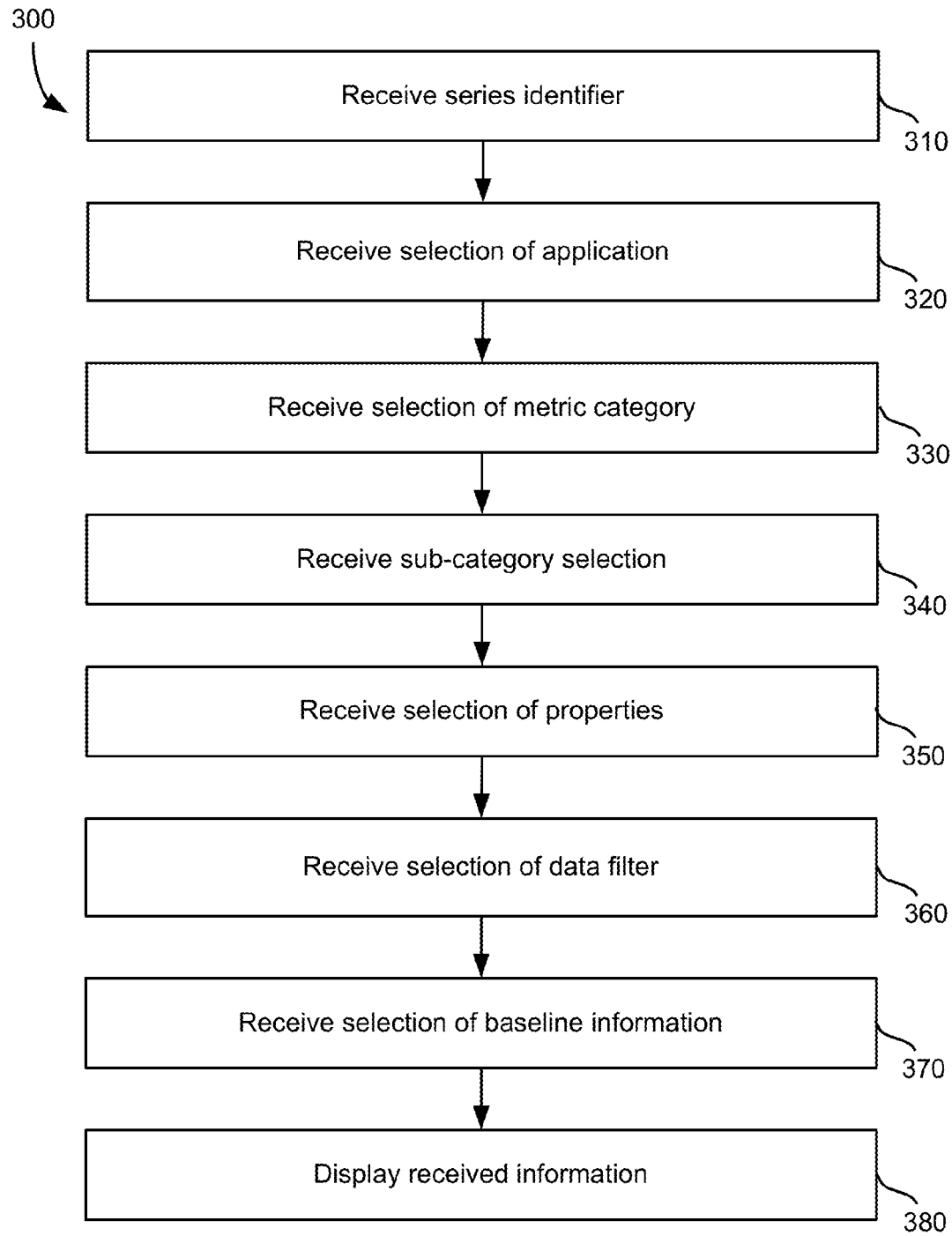
FIG. 3 is a method for configuring a series of data to be displayed in a custom dashboard.

When configuring a graph or a pie chart, a series of data may be added to display in the graph or a portion of the pie. For example, in FIG. 6, a user may add, edit or remove a series within the interface of FIG. 6. FIG. 3 is a method for configuring a series of data to be displayed in a custom dashboard, for example, within a graph or chart. In some instances, the method of FIG. 3 may be performed through an interface such as that illustrated in FIG. 7.

First, a series identifier may be received at step 310. The series identifier may include the name of the series. An application may be selected at step 320. The application may include any application being monitored by the system or otherwise identifiable by a user.

Figure 7:
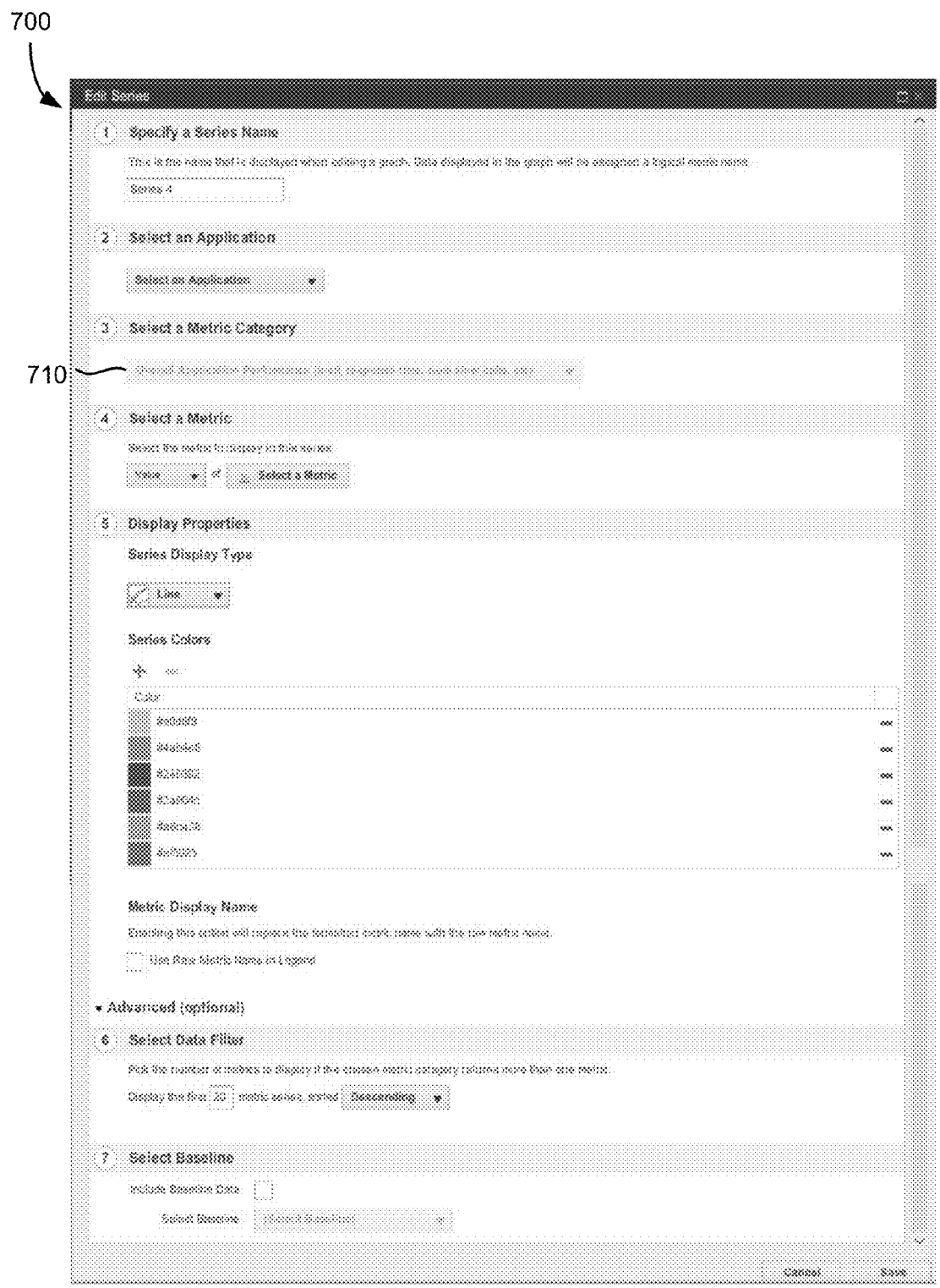
FIG. 7 is an interface for configuring a series of data to be displayed in a custom dashboard.
Figure 8:
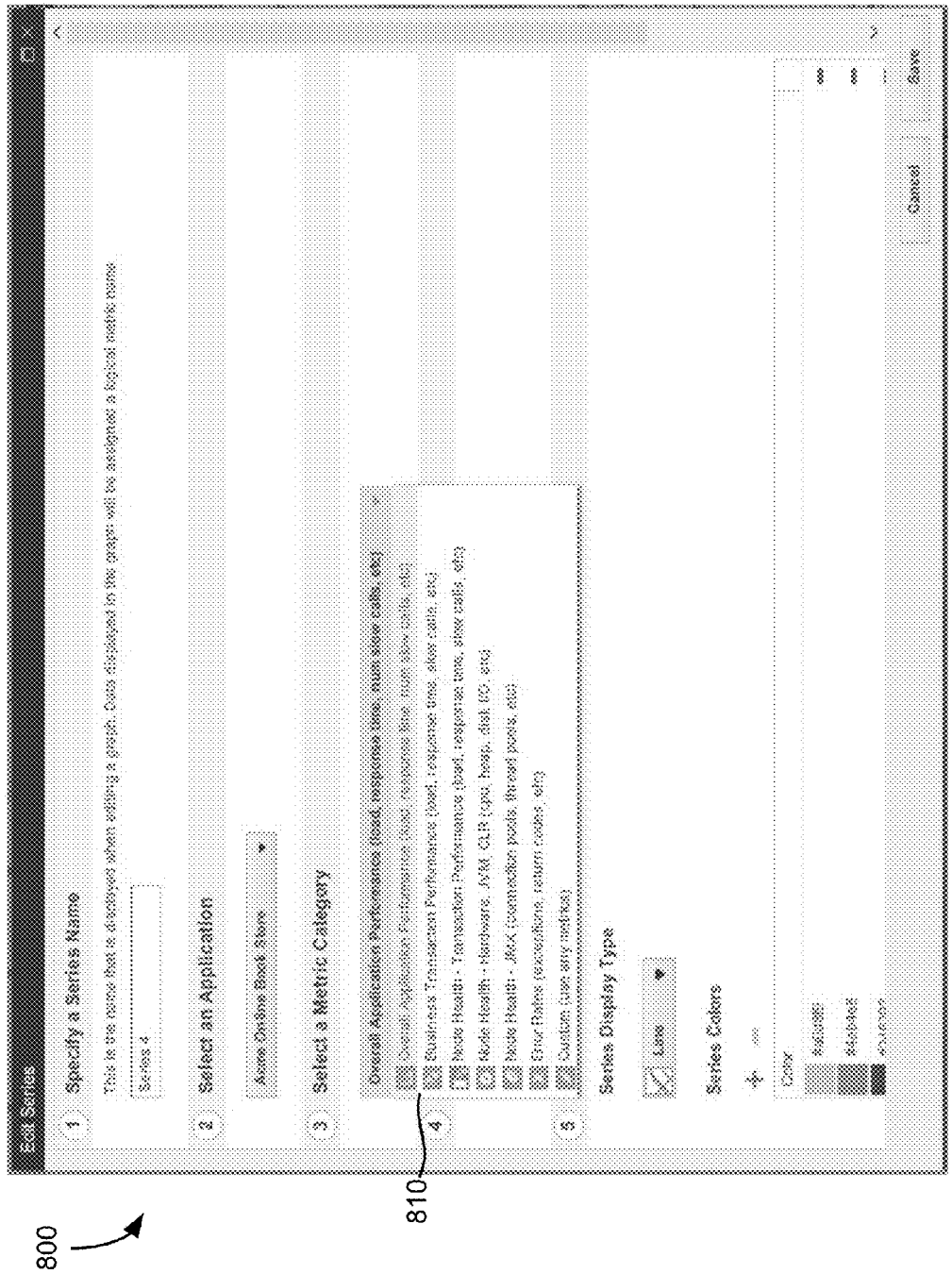
FIG. 8 is an interface for selecting a metric category associated with a series of data.

A selection of a metric category may then be received at step 330. A metric category may be selected from a set of predetermined choices or may be provided by a user. In the interface of FIG. 7, a metric category is selected at drop down menu box 710. Examples of metric categories include overall application performance, business transaction performance, node health transaction performance, node health for hardware, node health for JMX, error rates, and any other metric which may be custom defined by a user. An exemplary interface including a dropdown menu for selecting a metric category is illustrated in the interface of FIG. 8.

A subcategory selection may be received at step 340. A sub-category may further define the metric category with regard to what information will be displayed in the series of data being configured. In some instances, the sub-category selection may be received through a drop down menu provided in the series configuration interface and may depend on the selected metric category.

Figure 9:
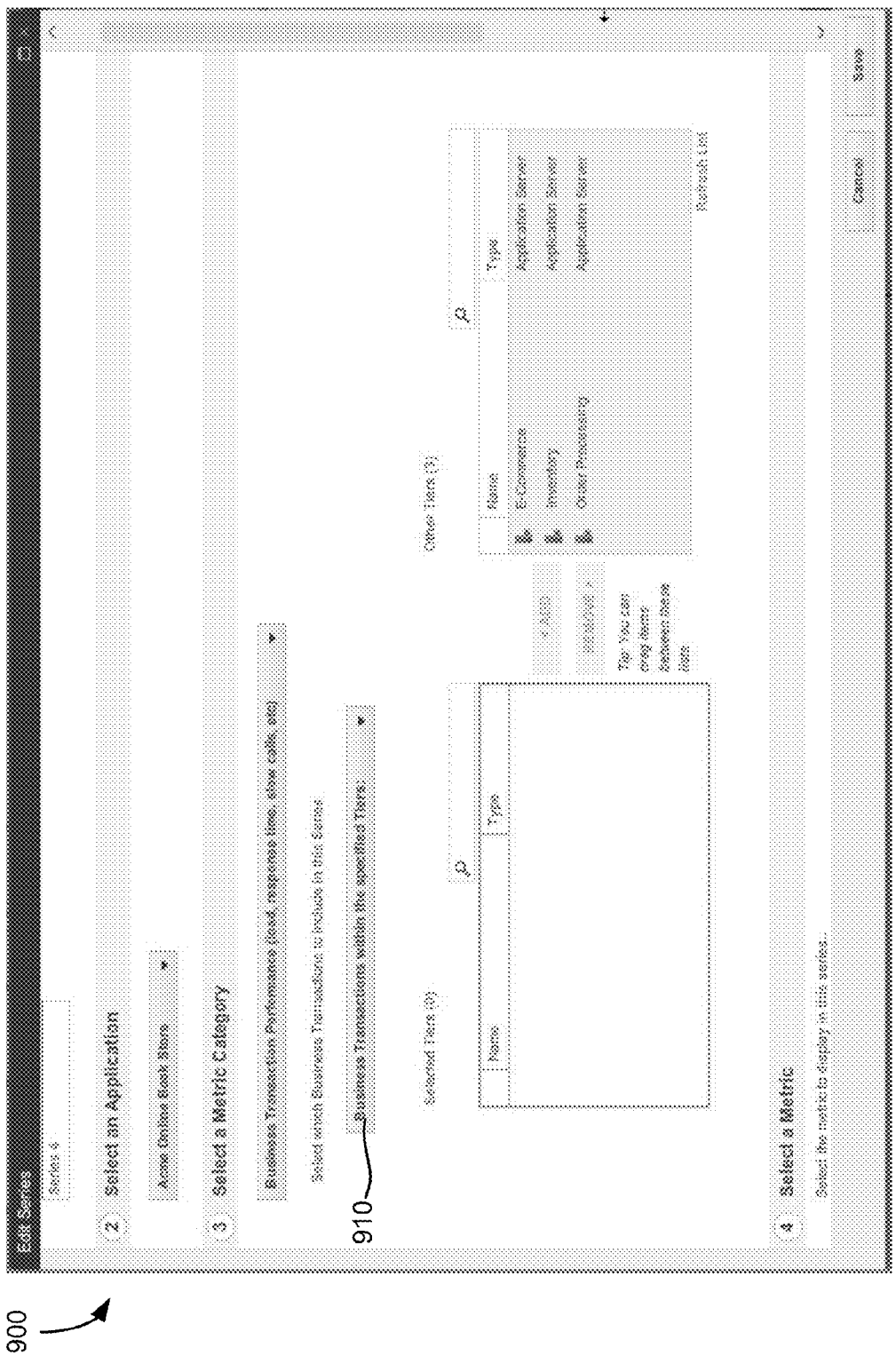
FIG. 9 is an interface for selecting business transactions to associate with a metric category.

FIG. 9 is an interface for selecting business transactions to associate with a metric category. In interface 900 of FIG. 9, a sub-category 910 of "Business Transactions within the specified tiers" is selected for a metric category of "Business transaction Performance." selected at 810 in FIG. 8. The interface provides a number of available tiers that may be selected by a user. The tiers illustrated include E-Commerce, Inventory, and Order Processing. A series of data representing business transaction performance will be determined from business transactions within the tiers selected by the user.

Other exemplary sub-categories for the business transaction performance category may include all business transactions in the application, a set of specified business transactions provided by a user, and business transactions matching the following criteria.

For a metric category of business transactions within a specified tier, a user may specify sub-categories of a particular tier of transactions, for example ecommerce tiers, inventory, and order processing tiers. For a category of specified business transactions, a user may select sub-categories of one or more transactions from all the business transactions associated with the particular application a user has selected. For a category of business transactions matching a criteria, a user may select a sub-category by creating a rule to specify the criteria, such as something that equals, starts with, ends with, contains, or matches.

For a selected metric category of node health transaction performance, a user may provide subcategory information to select what to include in the series, such as tiers or nodes. For example, for tiers, a user may identify to include all tiers in the application or a specific number of tiers. The tiers may be associated with ecommerce, inventory, or order processing. If a user selects to include one or more nodes in a node health transaction performance the user may select type of node such as java nodes or .net nodes. A user may also specify to include all nodes, nodes within a specified tier, specified nodes, or nodes that match particular criteria.

If a user selects a metric category of node health for hardware, a user may similarly select whether to include tiers or nodes as well as which tiers and nodes to include. If a user selects node health, for JMX connection pools, thread pools, and so forth, the user may provide subcategory information identifying what JMX objects the series will include. When a user selects a category of error rates, a user may select errors that the series will include for example all errors, specific errors, errors within a specified tier, or errors that match particular criteria.

A user may also select a custom category which may use any sort of metric. A user may select a particular metric to display in the new series by selecting a value and the particular metric.

When selecting a metric category and metric sub-category, the user selections may not specify a particular method or transaction, but rather a group of transactions or methods, for example those that correspond to a tier, a node, a rule which specifies a criteria, and other groupings. These groupings may change over time, and therefore result in a series of data that change over time. Embodiments of the invention allow a user to specify groupings of transactions or methods to provide in a dashboard. The dashboard may be dynamically updated based on the current application, allowing the dashboard to provide up-to-date data for the groupings A selection of a particular property may then be received at step 350. The selected metric may include a minimum value, maximum value, sum, count, or the current value of the metric. The property to display may include a series display type, a color, and a metric display name. The type may include a line, an area or a column. The metric display name may be configured such that a formatted metric name may be replaced with a raw metric name.

A data filter may be selected for configuration at step 360. When configuring a data filter, a user may pick the number of metrics to display if the chosen metric category returns more than one metric. For example, a user may select to display the first 20 metric series and may sort them as descending or ascending.

A selection of baseline information may be received at step 370. The baseline information may include whether or not to include baseline data and then what baseline data to include. The baseline data to include may include a default baseline, all data within the last 15 days, a daily trend for the last 30 days, a weekly trend, or a monthly trend.

FIG. 4 is an exemplary interface for creating a custom dashboard. The interface of FIG. 4 includes interface 410, a document window 430, toolbar 420, label widget 440, graph widget 450, metric value widget 460, pie chart widget 470, and status light widgets 482 and 484. The toolbar 420 lists a number of buttons which may be selected by a user for creating the custom dashboard.

The buttons include viewing the dashboard, adding a widget, editing the dashboard properties, sharing the dashboard, saving the dashboard, and more options. The view button may be used to view the current dashboard as it would be viewed by a user. Adding a widget enables a user to add a label, graph, metric value, IFrame, image, pie, or status light. Editing the properties allows a user to edit properties, such as background color and name, of the current custom dashboard being generated. The share icon allows a user to indicate whether to copy, e-mail, or otherwise share the current dashboard. Additional actions may include manipulating widgets to the front or back, duplicating a widget, showing a grid, allowing widgets to be snapped to the grid, and other general creation preferences.

In some instances, a dashboard may be shared using a retractable token. An owner (e.g., one that created the dashboard) may share a dashboard with another, including the general public, and restrict access to the dashboard at a later date. Access to the shared dashboard may be restricted using a unique token that must be included in the dashboard request. An owner may change the permissions associated with the dashboard to add or revoke a user or group of users' access to view a dashboard.

A property window 490 may enable a user to configure a particular widget. Examples of property windows for configuring widgets are illustrated in FIGS. 5-9 and discussed above with respect to the methods of FIGS. 2-3.

Figure 10:
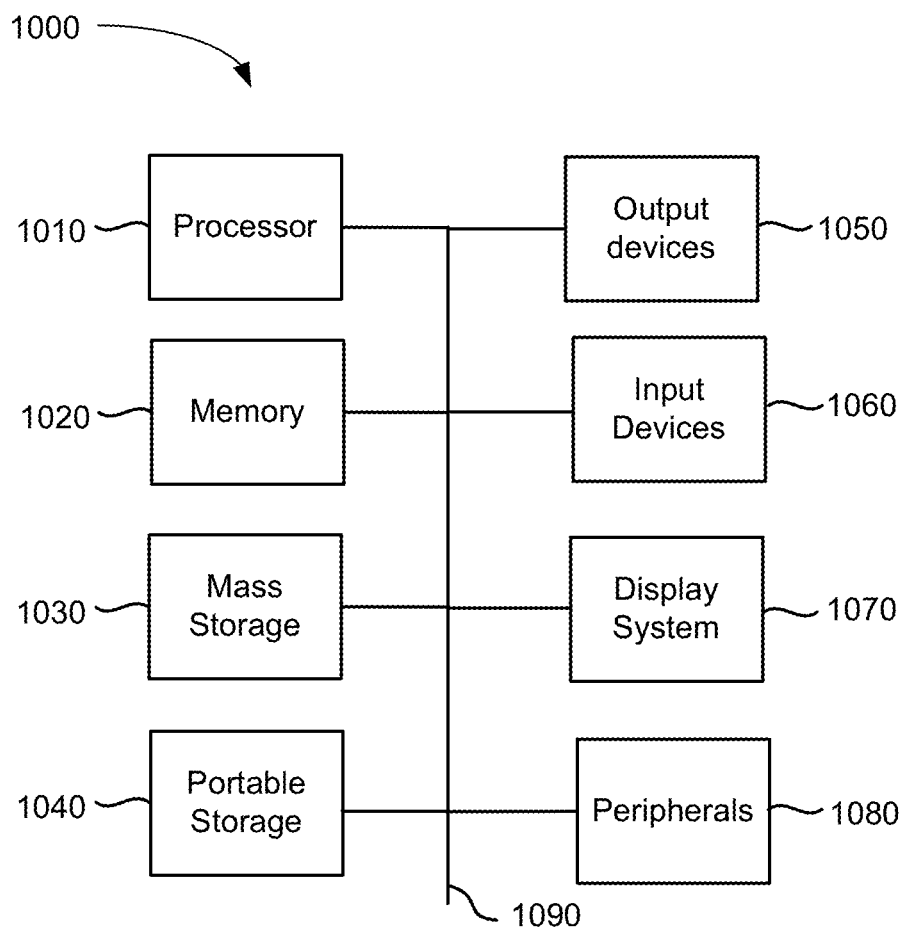
FIG. 10 is a block diagram of a system for implementing the present technology.

FIG. 10 is a block diagram of an exemplary computing system for implementing the present technology. System 1000 of FIG. 10 may be implemented in the contexts of the likes of client computer 105, servers 130, 140, and 150, controller 190 and client device 192. The computing system 1000 of FIG. 10 includes one or more processors 1010 and memory 1020. Main memory 1020 stores, in part, instructions and data for execution by processor 1010. Main memory 1020 can store the executable code when in operation. The system 1000 of FIG. 10 further includes a mass storage device 1030, portable storage medium drive(s) 1040, output devices 1050, user input devices 1060, a graphics display 1070, and peripheral devices 1080.

The components shown in FIG. 10 are depicted as being connected via a single bus 1090. However, the components may be connected through one or more data transport means.

For example, processor unit 1010 and main memory 1020 may be connected via a local microprocessor bus, and the mass storage device 1030, peripheral device(s) 1080, portable storage device 1040, and display system 1070 may be connected via one or more input/output (I/O) buses.

Mass storage device 1030, which may be implemented with a magnetic disk drive or an optical disk drive, is a non-volatile storage device for storing data and instructions for use by processor unit 1010. Mass storage device 1030 can store the system software for implementing embodiments of the present invention for purposes of loading that software into main memory 1020.

Portable storage device 1040 operates in conjunction with a portable non-volatile storage medium, such as a floppy disk, compact disk or Digital video disc, to input and output data and code to and from the computer system 1000 of FIG. 10. The system software for implementing embodiments of the present invention may be stored on such a portable medium and input to the computer system 1000 via the portable storage device 1040.

Input devices 1060 provide a portion of a user interface. Input devices 1060 may include an alpha-numeric keypad, such as a keyboard, for inputting alpha-numeric and other information, or a pointing device, such as a mouse, a trackball, stylus, or cursor direction keys. Additionally, the system 1000 as shown in FIG. 10 includes output devices 1050. Examples of suitable output devices include speakers, printers, network interfaces, and monitors.

Display system 1070 may include a liquid crystal display (LCD) or other suitable display device. Display system 1070 receives textual and graphical information, and processes the information for output to the display device.

Peripherals 1080 may include any type of computer support device to add additional functionality to the computer system. For example, peripheral device(s) 1080 may include a modem or a router.

The components contained in the computer system 1000 of FIG. 10 are those typically found in computer systems that may be suitable for use with embodiments of the present invention and are intended to represent a broad category of such computer components that are well known in the art. Thus, the computer system 1000 of FIG. 10 can be a personal computer, hand held computing device, telephone, mobile computing device, workstation, server, minicomputer, mainframe computer, or any other computing device. The computer can also include different bus configurations, networked platforms, multi-processor platforms, etc. Various operating systems can be used including Unix, Linux, Windows, Macintosh OS, Palm OS, and other suitable operating systems.

Figure 11:
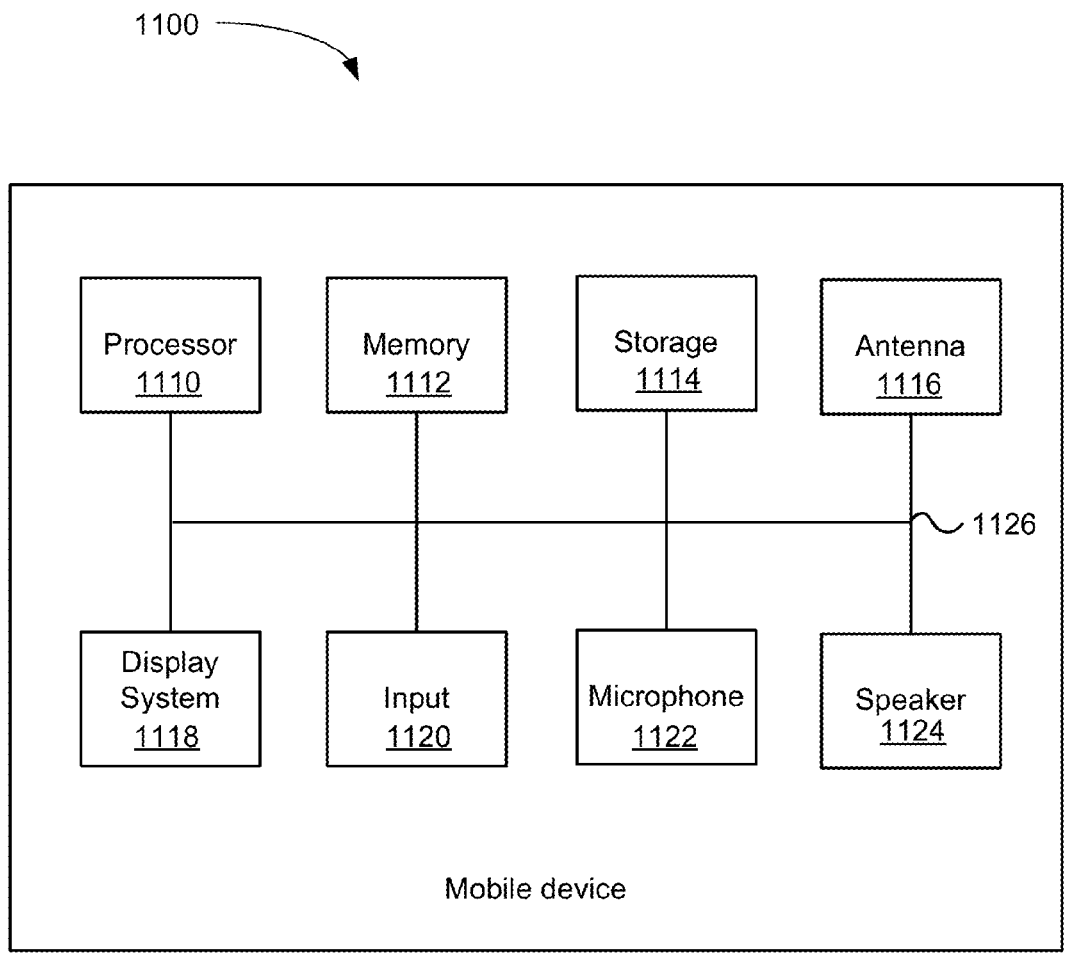
FIG. 11 is a block diagram of an exemplary mobile device for implementing the present technology.

FIG. 11 is a block diagram of an exemplary mobile device for implementing the present technology. The system of FIG. 11 may be used to implement mobile device 115, and optionally client device 192. Mobile device 1100 of FIG. 11 includes one or more processors 1110 and memory 1112. Memory 1112 stores, in part, programs, instructions and data for execution and processing by processor 1110. The system 1100 of FIG. 11 further includes storage 1114, one or more antennas 1116, a display system 1118, inputs 1120, one or more microphones 1122, and one or more speakers 1124.

The components shown in FIG. 11 are depicted as being connected via a single bus 1126. However, the components 1110-824 may be connected through one or more data transport means. For example, processor unit 1110 and main memory 1112 may be connected via a local microprocessor bus, and storage 1114, display system 1118, input 1120, and microphone 1122 and speaker 1124 may be connected via one or more input/output (I/O) buses.

Memory 1112 may include local memory such as RAM and ROM, portable memory in the form of an insertable memory card or other attachment (e.g., via universal serial bus), a magnetic disk drive or an optical disk drive, a form of FLASH or PROM memory, or other electronic storage medium. Memory 1112 can store the system software for implementing embodiments of the present invention for purposes of loading that software into main memory 1110.

Antenna 1116 may include one or more antennas for communicating wirelessly with another device. Antenna 1116 may be used, for example, to communicate wirelessly via Wi-Fi, Bluetooth, with a cellular network, or with other wireless protocols and systems. The one or more antennas may be controlled by a processor 1110, which may include a controller, to transmit and receive wireless signals. For example, processor 1110 execute programs stored in memory 1112 to control antenna 1116 transmit a wireless signal to a cellular network and receive a wireless signal from a cellular network.

Display system 1118 may include a liquid crystal display (LCD), a touch screen display, or other suitable display device. Display system 1118 may be controlled to display textual and graphical information and output to text and graphics through a display device. When implemented with a touch screen display, the display system may receive input and transmit the input to processor 1110 and memory 1112.

Input devices 1120 provide a portion of a user interface. Input devices 1120 may include an alpha-numeric keypad, such as a keyboard, for inputting alpha-numeric and other information, a touch-screen, microphone, camera, buttons or switches, a trackball, stylus, or cursor direction keys.

Microphone 1122 may include one or more microphone devices which transmit captured acoustic signals to processor 1110 and memory 1112. The acoustic signals may be processed to transmit over a network via antenna 1116.

Speaker 1124 may provide an audio output for mobile device 1100. For example, a signal received at antenna 1116 may be processed by a program stored in memory 1112 and executed by processor 1110. The output of the executed program may be provided to speaker 1124 which provides audio. Additionally, processor 1110 may generate an audio signal, for example an audible alert, and output the audible alert through speaker 1124.

The mobile device system 1100 as shown in FIG. 11 may include devices and components in addition to those illustrated in FIG. 11. For example, mobile device system 1100 may include an additional network interface such as a universal serial bus (USB) port.

The components contained in the computer system 800 of FIG. 8A are those typically found in mobile device systems that may be suitable for use with embodiments of the present invention and are intended to represent a broad category of such mobile device components that are well known in the art. Thus, the computer system 800 of FIG. 8A can be a cellular phone, smart phone, hand held computing device, minicomputer, or any other computing device. The mobile device can also include different bus configurations, networked platforms, multi-processor platforms, etc. Various operating systems can be used including Unix, Linux, Windows, Macintosh OS, Google OS, Palm OS, and other suitable operating systems.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claims appended hereto.

What is claimed is:

1. A method for providing a custom dashboard to display runtime data associated with a distributed business transaction performed by a system of machines or nodes connected over a network, the method comprising:
   monitoring the distributed business transaction performed by the system of machines or nodes connected over the network;
   receiving the runtime data collected from the system of machines or nodes, the runtime data indicative of a performance of the monitored distributed business transaction;
   providing a dashboard interface by a server to a remote device for configuring the custom dashboard for displaying the collected runtime data indicative of the performance of the monitored distributed business transaction associated with the system of machines or nodes connected over the network;
   providing through the dashboard interface, a choice to select from one of predetermined categories of metrics and custom defined categories of metrics in the collected runtime data;
   receiving a selection from the provided choice of predetermined categories of metrics and custom defined categories of metrics;
   receiving an input which specifies a filter for displaying metrics associated with the selected category including a number of and sort order of the metrics;
   dynamically displaying, through the dashboard interface, the custom dashboard that includes the filter specified number of the metrics and in the filter specified sort order, wherein the metrics displayed in the custom dashboard are selected from the collected runtime data dynamically at the time the custom dashboard is displayed so as to be up-to-date at the time the custom dashboard is displayed; and
   applying the filter dynamically each time the custom dashboard is displayed to reselect the metrics dynamically each time the custom dashboard is displayed.

2. The method of claim 1, wherein the filter identifies a performance threshold for the metrics in the collected runtime data.

3. The method of claim 1, wherein the custom dashboard is shared using a retractable token to change or revoke access to the custom dashboard.

4. The method of claim 1, including receiving an input indicating a selection of one or more widgets available for displaying the custom dashboard on the dashboard interface.

5. The method of claim 4, including receiving an input indicating a physical display location and size of the one or more widgets on the custom dashboard.

6. The method of claim 1, wherein the metrics include overall application performance data, business transaction performance data, node health transaction performance data, node health for hardware data, node health for JMX data, error rates data, or hardware metrics data associated with the monitored distributed business transaction.

7. The method of claim 1, wherein the filter specifies a predetermined number of top or bottom of the metrics that meet specific criteria.

8. The method of claim 1, including:
   receiving a selection of baseline data information; and
   determining whether to include baseline data and what baseline data to include in the displayed customer dashboard responsive to the received selection of baseline information.

9. A computer readable storage medium having embodied thereon a program, the program being executable by a processor to perform operations for providing a custom dashboard to display runtime data associated with a distributed business transaction performed by a system of machines or nodes connected over a network, the method comprising:
   monitoring the distributed business transaction performed by the system of machines or nodes connected over the network;
   receiving the runtime data collected from the system of machines or nodes, the runtime data indicative of a performance of the monitored distributed business transaction;
   providing a dashboard interface by a server to a remote device for configuring the custom dashboard for displaying the collected runtime data indicative of the performance of the monitored distributed business transaction associated with the system of machines or nodes connected over the network;
   providing through the dashboard interface, a choice to select from one of predetermined categories of metrics and custom defined categories of metrics in the collected runtime data;
   receiving a selection from the provided choice of predetermined categories of metrics and custom defined categories of metrics;
   receiving an input which specifies a filter for displaying metrics associated with the selected category including a number of and sort order of the metrics;
   dynamically displaying, through the dashboard interface, the custom dashboard that includes the filter specified number of the metrics and in the filter specified sort order, wherein the metrics displayed in the custom dashboard are selected from the collected runtime data dynamically at the time the custom dashboard is displayed so as to be up-to-date at the time the custom dashboard is displayed; and
   applying the filter dynamically each time the custom dashboard is displayed to reselect the metrics dynamically each time the custom dashboard is displayed.

10. The computer readable storage medium of claim 9, wherein the filter identifies a performance threshold for the metrics in the runtime data.

11. The computer readable storage medium of claim 9, wherein the custom dashboard is shared using a retractable token to change or revoke access to the custom dashboard.

12. The computer readable storage medium of claim 11, wherein the filter specifies a predetermined number of top or bottom of the metrics that meet specific criteria.

13. The computer readable storage medium of claim 11, the method including:
    receiving a selection of baseline data information; and
    determining whether to include baseline data and what baseline data to include in the displayed customer dashboard responsive to the received selection of baseline information.

14. The computer readable storage medium of claim 9, the method including receiving an input indicating a selection of one or more widgets available for displaying the custom dashboard on the dashboard interface.

15. The computer readable storage medium of claim 14, the method including receiving an input indicating a physical display location and size of the one or more widgets on the custom dashboard.

16. The computer readable storage medium of claim 9, wherein the metrics include overall application performance data, business transaction performance data, node health transaction performance data, node health for hardware data, node health for JMX data, error rates data, or hardware metrics data associated with the distributed business transaction.

17. The computer readable storage medium of claim 9, wherein the custom dashboard is dynamically updated as the business transaction is updated.

18. The computer readable storage medium of claim 9, the method including:
receiving a selection of a metric sub-category for the selected category; and
displaying the customer dashboard to include metrics that are within the selected metric category and metric sub-category.

19. The computer readable storage medium of claim 9, the method including:
receiving a request to display the custom dashboard after the dashboard is saved; and
dynamically displaying the custom dashboard to show updated metrics that satisfy the filter.

20. The computer readable storage medium of claim 9, the method further comprising:
receiving a selection to provide a series of data in the custom dashboard in a graphical format; and
reporting the performance data for the distributed transaction that is within specified entities in a graphical format.

21. The computer readable storage medium of claim 9, the method including automatically providing a standard report of the runtime data separate from the custom dashboard.

22. The computer readable storage medium of claim 9, wherein the filter specifies a predetermined number of top or bottom of the metrics that meet specific criteria.

23. A system for providing a custom dashboard to display runtime data associated with a distributed business transaction performed by a system of machines or nodes connected over a network, the system comprising:
a server including a memory and a processor; and
one or more modules stored in the memory and executed by the processor to perform operations including:
monitor the distributed business transaction performed by the system of machines or nodes connected over the network;
receive the runtime data collected from the system of machines or nodes, the runtime data indicative of a performance of the distributed business transaction;
provide a dashboard interface by a server to a remote device for configuring the custom dashboard for displaying the collected runtime data indicative of the performance of the monitored distributed business transaction associated with the system of machines or nodes connected over the network;
provide through the dashboard interface, a choice to select from one of predetermined categories of metrics and custom defined categories of metrics in the collected runtime data;
receive a selection from the provided choice of predetermined categories of metrics and custom defined categories of metrics;
receive an input which specifies a filter for displaying metrics associated with the selected category including a number of and sort order of the metrics;
dynamically display, through the dashboard interface, the custom dashboard that includes the filter specified number of the metrics and in the filter specified sort order, wherein the metrics displayed in the custom dashboard are selected from the collected runtime data dynamically at the time the custom report is displayed so as to be up-to-date at the time the custom report is provided; and
apply the filter dynamically each time the custom dashboard is displayed to reselect the metrics dynamically each time the custom dashboard is displayed.

24. The system of claim 23, wherein the filter identifies a performance threshold for the metrics in the runtime data.

25. The system of claim 23, wherein the custom dashboard is shared using a retractable token to change or revoke access to the custom dashboard.

26. The system of claim 23, wherein the one or more modules stored in the memory and executed by the processor are configured to perform operations including receiving an input indicating a selection of one or more widgets available for displaying the custom dashboard on the dashboard interface.

27. The system of claim 26, wherein the one or more modules stored in the memory and executed by the processor are configured to perform operations including receiving an input indicating a physical display location and size of the one or more widgets on the custom dashboard.

28. The system of claim 23, wherein the metrics include overall application performance data, business transaction performance data, node health transaction performance data, node health for hardware data, node health for JMX data, error rates data, or hardware metrics data associated with the monitored distributed business transaction.

29. The system of claim 23, wherein the filter specifies a predetermined number of top or bottom of the metrics that meet specific criteria.

30. The system of claim 23, wherein the one or more modules stored in the memory and executed by the processor are configured to perform operations including:
receive a selection of baseline data information; and
determine whether to include baseline data and what baseline data to include in the customer dashboard responsive to the received selection of baseline information.

31. The system of claim 23, wherein the custom dashboard is dynamically updated as the monitored business transaction is updated.

32. The system of claim 23, wherein the one or more modules are executable to perform operations including:
receive a selection of a metric sub-category for the selected category; and
display the customer dashboard to include metrics that are within the selected metric category and metric sub-category.

33. The system of claim 23, wherein the one or more modules are executable to perform operations including:
receive a request to display the custom dashboard after the dashboard is saved; and
dynamically display the custom dashboard to show updated metrics that satisfy the filter.

34. The system of claim 23, wherein the one or more modules are executable to perform operations including:
  receive a selection to provide a series of data in the custom dashboard in a graphical format; and
  report performance data for the monitored business transaction that is within specified entities in a graphical format.

35. The system of claim 23, wherein the one or more modules are executable to perform operations including automatically provide a standard report of the runtime data separate from the custom dashboard.

36. The system of claim 23, wherein the filter specifies a predetermined number of top or bottom of the metrics that meet specific criteria.

\* \* \* \* \*